US005633928A

United States Patent [19]
Lenstra et al.

[11] Patent Number: 5,633,928
[45] Date of Patent: May 27, 1997

[54] KEY ESCROW METHOD WITH WARRANT BOUNDS

[75] Inventors: Arjen K. Lenstra, Basking Ridge; Peter M. Winkler, Madison; Yacov Yacobi, Berkeley Heights, all of N.J.

[73] Assignee: Bell Communications Research, Inc., Morristown, N.J.

[21] Appl. No.: 402,176

[22] Filed: Mar. 10, 1995

[51] Int. Cl.$^6$ .................................................. H04L 9/00
[52] U.S. Cl. ................................... 380/21; 380/30; 380/49
[58] Field of Search .................................. 380/21, 30, 49

[56] References Cited

U.S. PATENT DOCUMENTS

| 5,150,411 | 9/1992 | Maurer | 380/30 |
|---|---|---|---|
| 5,315,658 | 5/1994 | Micali | 380/30 |
| 5,475,763 | 12/1995 | Kaufman et al. | 380/30 |
| 5,481,613 | 1/1996 | Ford et al. | 380/30 |
| 5,519,778 | 5/1996 | Leighton et al. | 380/30 |
| 5,557,678 | 9/1996 | Ganesan | 380/21 |

OTHER PUBLICATIONS

J. Kilian, 'Failsafe Key Escrow,' MIT/LCS/TR–636, 17 Aug. 1994, (Princeton, NJ) presented at Rump Crypto '94.
S. Micali, "Fair Public Key Cryptosystems," Proc. Crypto'92. particularly section 8.3 pp. 131–135.
Administrative Office of the United States Courts, 1993 Report on Applications for Orders Authorizing or Approving the Interception of Wire, Oral, or Electronic Communications (Wiretap Report), 1993.
National Institute of Standards and Technology, Federal Information Processing Standards Publication 185, Escrowed Encryption Standard, Feb. 9, 1994, Washington, DC.
J. Kilian, T. Leighton, "Failsafe Key Escrow," presented at Rump Crypto '94.
T. P. Pedersen, "Distributed Provers with Application to Undeniable Signatures", Proc. Eurocript '91, Springer–Verlag LNCS 547, pp. 221–238.

*Primary Examiner*—Thomas H. Tarcza
*Assistant Examiner*—Pinchus M. Laufer
*Attorney, Agent, or Firm*—Joseph Giordano; Loria B. Yeadon

[57] ABSTRACT

A key escrow technique is disclosed which permits cryptographic limits on wiretapping warrants. Specifically, time limits on wiretaps may be enforced. In addition, the wiretapper is targeted to a specific party or specific pairs of parties communicating in a network.

24 Claims, 3 Drawing Sheets

PROTOCOL

TERMINAL a

1. $k(a,b,d) = h(P(b)^{S(a)}, d)$

2. $S(a,d) = h(S(a), d)$

3. $S(a,b,d) = h(S(a,d), P(b))$

4. $c(a,b,d) = f(S(a,b,d), k(a,b,d)) \rightarrow$

TERMINAL b $k(b,a,d) = h(P(a)^{S(b)}, d)$ $S(b,d) = h(S(b), d)$ $S(b,a,d) = h(S(b,d), P(a))$ $\leftarrow c(b,a,d) = f(S(b,a,d), k(b,a,d))$ 5. TERMINALS a AND b COMMUNICATE USING CIPHER FUNCTION f AND $k(a,b,d) = k(b,a,d)$ AS SESSION KEY.

6. TRUSTEE PROVIDES WIRETAPPER WITH SUFFICIENT INFORMATION (S(a,d) OR S(a,b,d)) FOR WIRETAPPER TO DETERMINE $k(a,b,d)$.

7. WIRETAPPER INTERCEPTS AND DECRYPTS MESSAGES TRANSMITTED BETWEEN TERMINALS a AND b.

FIG. 2

PROTOCOL

| TERMINAL a | TERMINAL b |
|---|---|
| 1. $k(a,b,d) = h(P(b)^{S(a)}, d)$ | $k(b,a,d) = h(P(a)^{S(b)}, d)$ |
| 2. $S(a,d) = h(S(a), d)$ | $S(b,d) = h(S(b), d)$ |
| 3. $S(a,b,d) = h(S(a,d), P(b))$ | $S(b,a,d) = h(S(b,d), P(a))$ |
| 4. $c(a,b,d) = f(S(a,b,d), k(a,b,d)) \longrightarrow$ | $\longleftarrow c(b,a,d) = f(S(b,a,d), k(b,a,d))$ |

5. TERMINALS a AND b COMMUNICATE USING CIPHER FUNCTION f AND $k(a,b,d) = k(b,a,d)$ AS SESSION KEY.

6. TRUSTEE PROVIDES WIRETAPPER WITH SUFFICIENT INFORMATION ($S(a,d)$ OR $S(a,b,d)$) FOR WIRETAPPER TO DETERMINE $k(a,b,d)$.

7. WIRETAPPER INTERCEPTS AND DECRYPTS MESSAGES TRANSMITTED BETWEEN TERMINALS a AND b.

FIG. 3

THRESHOLD SECRET SHARING PROTOCOL

TERMINAL a

1. $k(a,b,d) = h(P(b)^{S(a)}, d)$

2. $S_i(a,d) = h(S_i(a), d)$ FOR $1 \leq i \leq n$

3. $S_i(a,b,d) = h(S_i(a,d), P(b))$

4. $S(a,b,d) = T(S_1(a,b,d), S_2(a,b,d), \ldots, S_n(a,b,d))$

5. $c(a,b,d) = f(S(a,b,d), k(a,b,d))$

6. TERMINAL a SENDS MESSAGE TO TERMINAL b USING CIPHER FUNCTION f AND $k(a,b,d)$ AS THE SESSION KEY.

7. TRUSTEES PROVIDE WIRETAPPER WITH $S_i(a,d)$ S FOR NODE SURVEILLANCE OR $S_i(a,b,d)$ S FOR EDGE SURVEILLANCE.

8. WIRETAPPER THEN DECRYPTS MESSAGES FROM TERMINAL a TO TERMINAL b.

KEY ESCROW METHOD WITH WARRANT BOUNDS

KEY OF THE INVENTION

The present invention relates to a key escrow method for use in a telecommunications network that facilitates warrants for wiretapping for bounded time periods. One or two communicating parties may be specified as the target of the wiretap. The inventive key escrow method for wiretapping is simple, practical and affords reasonable protection against misuse. The inventive method provides both greater privacy protection and more effective law enforcement than prior art techniques.

BACKGROUND OF THE INVENTION

In a key cryptography system, users encrypt messages using a secret session key k and a conventional block cipher function f. The conventional block cipher function may, for example, be the U.S. standard Digital Encryption Scheme (DES) or some variation such as "triple DES".

A transmitting party can encrypt the clear text message m to obtain the cipher text message c according to $c=f(k,m)$. The receiving party can decrypt the message according to $m=f^{-1}(k,c)$. In the foregoing, k, m, and c are bit strings. It is assumed that m can be efficiently derived from c if, and only if, k is known, but that k cannot be efficiently derived from c and m.

In general, the session key k is generated by both parties based on information available to both parties at the time of the communication. In many cases, both parties must access information maintained by a trusted central authority (trustee) to generate the common session key k. In other cases, the parties have sufficient information themselves to generate the common session key k at the start of a communication session.

U.S. law enforcement agencies, such as the Federal Bureau of Investigation (FBI), have complained that digital telephony and commercially available cryptography threaten the effectiveness of wire tapping. However, in many respects, digital communication techniques have made wiretapping easier.

Wiretapping is currently expensive. In 1993, the average cost of the installation and monitoring of a tap was $57,256 (see e.g., Administrative Office of the United States Courts, 1993, Report on Applications for Orders Authorizing or Approving the Interception of Wire, Oral, or Electronic Communications ("Wiretap Report"), 1993). There have been about 900 wiretaps ordered per year by state and federal authorities put together, with between 200,000 and 400,000 incriminating conversations recorded annually. The number of non-incriminating conversations recorded each year has increased to over 1.7 million. The non-incriminating conversations are weeded out "by hand" at a cost of time and money, and at a cost of privacy to innocent parties.

Advances in telecommunication technology have a significant effect on wiretapping. Cordless telephony and cellular telephony permit wiretapping without requiring actual physical property invasion of the party to be wiretapped. Programmable switches can obviate the necessity for special hardware for wiretapping. Digital messaging permits automatic sifting of conversations (by destination, content, etc.). Thus, the potential exists for cheaper and more effective use of wiretapping and the consequences for the privacy of citizens must be examined carefully.

The availability of public-key cryptography (e.g., RSA technique, Diffie Hellman technique, Kilian-Leighton technique, Rabin Moduler Square Root technique) and the explosion of public awareness of cryptography in general have put a powerful privacy enhancing tool in the hands of citizens. Conceivably, widespread use of encryption could cripple wiretapping as a law enforcement tool. In an effort to provide an alternative, the White House announced on Apr. 16, 1993 the "Escrowed Encryption Initiative". Subsequently, the National Institute of Standards and Technology (NIST) approved the "Escrowed Encryption Standard ("EES") for telephone systems (see National Institute of Standards and Technology, Federal Information Processing Standards Publication 185, Escrowed Encryption Standard, Feb. 9, 1994, Washington, DC).

The EES (known often by the name of its chip "Clipper") caused an outcry partly from cryptologists who opposed the use of a secret algorithm, and partly from rights advocates opposed to the whole idea of escrowed keys. The secret algorithm (known as SKIPJACK), and its consequent reliance on tamper proof hardware, is certainly unnecessary for an escrow system and various alternatives have been proposed (see e.g. J. Kilian, T. Leighton, "Failsafe Key Escrow," presented at Rump Crypto '94, S. Micali, "Fair Public Key Cryptosystems," Proc. Crypto '92).

The escrow issue itself is more troublesome. As presently constituted, EES calls for individual keys to be split into the hands of two "trustees" (namely, NIST and a branch of the U.S. Treasury Department). These trustees, when served with a proper warrant (e.g., a warrant issued by a court) will each turn their portion of the appropriate key over to the law enforcement authority.

The warrant itself will contain the usual limitations on target, content, and time interval (e.g., a specified 30-day period), but these limitations do not apply to the key. Instead, the law enforcement authority is supposed to "return" the key to the trustees at the expiration of the warrant period. However, non-compliance with this procedure does not provide the basis for a motion in a court to suppress the electronic surveillance evidence (see e.g., National Institute of Standards and Technology, Federal Information Processing Standards Publication 185, Escrowed Encryption Standard, Feb. 9, 1994, Washington, DC). From a practical point of view, it will always be difficult to prove that a law enforcement authority does, or does not, have possession of a particular key.

In effect, if citizens a and b give law enforcement authorities reason to believe they have or will use the telephone to commit a crime, each of them gives up his or her "cryptographic rights" for all time—past, present, and future. Such a concession may be viewed as excessive, even if one believes the law enforcement authorities have no intention of misusing a key. The automatic sifting of telephone conversations will increasingly tempt the authorities to gather large quantities of data for possible later use, when a key is held.

A key escrow method for use in a telecommunications system to facilitate wiretapping warrants has the following desirable characteristics:

1. Time Boundedness

It is desirable for the courts to enforce the time limits of a warrant by supplying a key that will only be effective for a particular period of time (e.g., a particular set of days).

2. Target Flexibility

It is desirable for the courts to permit either (i) node surveillance in which all communications involving a particular target a can be decrypted, or (ii) edge surveillance in which only communications between parties a and b are decrypted.

3. Non-circumventibility

Preferably, it should be impossible (or very difficult) for a user to unilaterally alter his communication protocol such that he can encrypt communications without exposing himself to decryption by the proper authorities. It is difficult to prevent persons from colluding, because any two parties can always use their own cryptography system, but a key escrow system or another system which provides for warrants should not make this easy.

4. Security

A key escrow method should rely on familiar and tested cryptographic techniques. A key escrow method preferably will avoid techniques that are not proven or do not have at least some built up empirical credibility.

5. Simplicity

The key escrow method should be practical and understandable. In particular, there should not be reliance on repeated contacts between users and trustees. Nor should there be required many round preliminaries between communicating parties. The key escrow system should not provide any impediment for telephone, fax, or e-mail communication. The system should be explicable in outline, if not mathematical form, to lay persons, such as the courts.

It is an object of the present invention to provide a key escrow method for use in a telecommunications system that facilitates warrants for wiretapping but that also has the desirable characteristics identified above.

SUMMARY OF THE INVENTION

The key escrow system, in accordance with a preferred embodiment of the invention, operates as follows:

1. Each party u has a public key $P(u)$ and a secret key $S(u)$ such that $g^{S(u)} = P(u)$ mod p. It is assumed that for all u, it is computationally infeasible to derive $S(u)$ from p,g and $P(u)$. This assumption is based on the difficulty of the discrete logarithm problem. In one embodiment of the invention, there is a single trustee who knows all the secret keys $S(u)$ (as well as the public keys $P(u)$) of all the parties u.

2. Let f be a conventional block cipher function like (triple) DES. The cipher text message c is obtained from the clear text message m, the function f and the session key k according to $c=f(k,m)$. The clear text message m is decrypted according to $m=f^{-1}(k,c)$. It should be noted that k cannot be derived from c and m.

3. Let h be a one way hash function such that given d, $d_i$ (where $d \neq d_i$), $Y_i = h(x,d_i)$ (where $i=1, 2, \ldots K$), and some unknown x, it is computationally infeasible to find $y=h(x,d)$. An example of such a hash function is as follows: let h(M) denote Rabin's hashing of message M using DES. For a hashing of size 64*K, Parse $M=M1$, $M2, \ldots MK$, and create $H'(M)=(h(M1), \ldots h(MK))$; i.e., a concatenation of K individual Rabin hashings. Finally, the hashing is $H(M)=H'(M)+A*M$ mod (64K), where A is a known constant.

Consider now a communication between party a with public and secret keys P(a) and S(a), and a party b with public and secret keys P(b) and S(b). This communication proceeds as follows during time period d, where d indicates a time period usually comprising a particular set of one or more days.

1. First parties a and b establish non-interactively, their session, key $k(a,b,d)=k(b,a,d)$ which is computed by party a as $k(a,b,d)=h(P(b)^{S(a)}, d)$ and by party b as $k(b,a,d)=h(P(a)^{S(b)}, d)$.

2. Next, before the actual communication using the common session key k (a,b,d) takes place, parties a and b exchange a message which enables a legal wiretapper to compute k(a,b,d) and to decrypt the communication between a and b. This is done as follows:

(i) Party a computes $S(a,d)=h(S(a),d))$ Party b computes $S(b,d)=h(S(b),d))$ (ii) Party a computes $S(a,b,d)=h(S(a,d),P(b))$ Party b computes $S(b,a,d)=h(S(b,d),P(a))$ (The quantities S(a,d), S(b,d), S(a,b,d), S(b,a,d) are also known to the trustee because the trustee knows S(a) and S(b)).

(iii) Party a sends the message:
$c(a,b,d)=f(S(a,b,d), k(a,b,d))$ to b.
Party b send the message:
$c(b,a,d)=f(S(b,a,d), k(b,a,d))$ to a.
Note that party a uses S(a,b,d) as a cipher key to encrypt k (a,b,d) using the function f. Therefore, Party b (or a wiretapper) cannot determine the common session key k(a,b,d) by decrypting c(a,b,d). Thus, party b has to compute the common session key as in step 1. Similarly, the party a, (or a wiretapper) cannot decrypt the message c(b,a,d) to obtain the key k (b,a,d).

3. The parties a and b communicate using the conventional block cipher function f using as a key k(a,b,d).

4. (i) In order for a wiretapper to wiretap the communication between a and b, the wiretapper must determine k(a,b,d). In general, the wiretapper intercepts c(a,b,d) and c(b,a,d). The wiretapper also knows f,h,P(a),P(b), but not S(a), S(b).

(ii) If there is a warrant for edge surveillance of the party a, the trustee provides the wiretapper with S(a,b,d) for all the specific parties b to which the warrant applies. Now, the wiretapper can decrypt c(a,b,d) to obtain k(a,b,d).

(iii) If there is a warrant for node surveillance, the trustee provides the wiretapper with S(a,d). Now the wiretapper who knows P(b) can compute S(a,b,d) for any party b who communicates with a. Knowing S(a,b,d), the wiretapper can decrypt c(a,b,d) and obtain k(a,b,d).

The above-described key escrow technique has a number of significant advantages. First, it is time bounded. The wiretapping can only take place during the time period d. Some privacy of the party a is maintained in that it is possible to limit the wiretapping to specific parties b that communicate with a by providing S(a,b,d) and not S(a,d). (It should be noted that the wiretapper can compute S(a,b,d) from S(a,d) but not S(a,d) from S(a,b,d)) because the hash function h is one way.) In addition, the inventive key escrow technique relies on time tested cryptographic functions and is not of high complexity.

It should be noted also that if party a cheats and sends a corrupted c(a,b,d) to b, the wiretapper will not be able to retrieve the correct session key. This problem can be overcome if a policy is implemented which permits the trustee in this case to provide the key S(a) to the wiretapper. This will then permit the wiretapper to decrypt all communications of party a.

It should be noted that if communication is unidirectional from party a to party b only (e.g., e-mail), the protocol is carried out by the party a only. Party b carries out its portion of the protocol when, and if, it responds.

In the foregoing embodiment of the inventive key escrow technique, it was assumed that there is a single trustee who has all of the secret keys S(u).

However, in some embodiments of the invention there are m (m>1) trustees. In this case, each trustee i has a verifiable share $S_i(u)$ of a user u's secret key $S(u)$. (The secret key $S(u)$ is a string of bits). Any subset n out of the m trustees whose verifiable shares of $S_i(u)$ are such that the complete $S(u)$ can be recovered. In other words, there is a threshold function T such that $T(S_{v1}(u), S_{v2}(u), \ldots, S_{vn}(u))=S(u)$ for a subset $\{v1, v2, \ldots, vn\}$ of $\{1, 2, \ldots, m\}$. An example of the threshold function T is disclosed by T. P. Pedersen, "Distributed Provers with Application To Undeniable Signatures", Proc. Eurocript '91, Springer-Verlag LNCS 547, pp. 221–238.

In this situation, each trustee is to provide the wiretapper with the trustee's relevant share of information. The above described protocol is, therefore, modified so that instead of computing $S(a,d)$, the party a computes $S_i(a,d)=h(S_i(a), d)$ for $1 \leq i \leq n$ and instead of computing $S(a,b,d)$, the party a computes $S_i(a,b,d)=h(s_i; (a,d), P(b))$. Then the party a computes $$S(a,b,d)=T(S_1(a,b,d), S_2(a,b,d), \ldots, S_n(a,b,d)).$$

After this $c(a,b,d)$ is computed as before. The changes for b are similar although the party b does not have to use the same n-subset of trustees as the party a.

Depending on the type of wiretap surveillance that is authorized, the wiretapper gets the $S_i(a,d)$'s (node surveillance) or the $S_i(a,b,d)$'s (edge surveillance) from n different trustees. In both cases, the wiretapper can derive the relevant $S(a,b,d)$ as above.

BRIEF DESCRIPTION OF THE DRAWINGS

FIG. 2 illustrates a key escrow protocol in accordance with an illustrative embodiment of the invention.

FIG. 3 illustrates a key escrow protocol involving multiple trustees in accordance with another illustrative embodiment of the invention.

DETAILED DESCRIPTION OF THE INVENTION

1. Telecommunications Network

Figure 1:
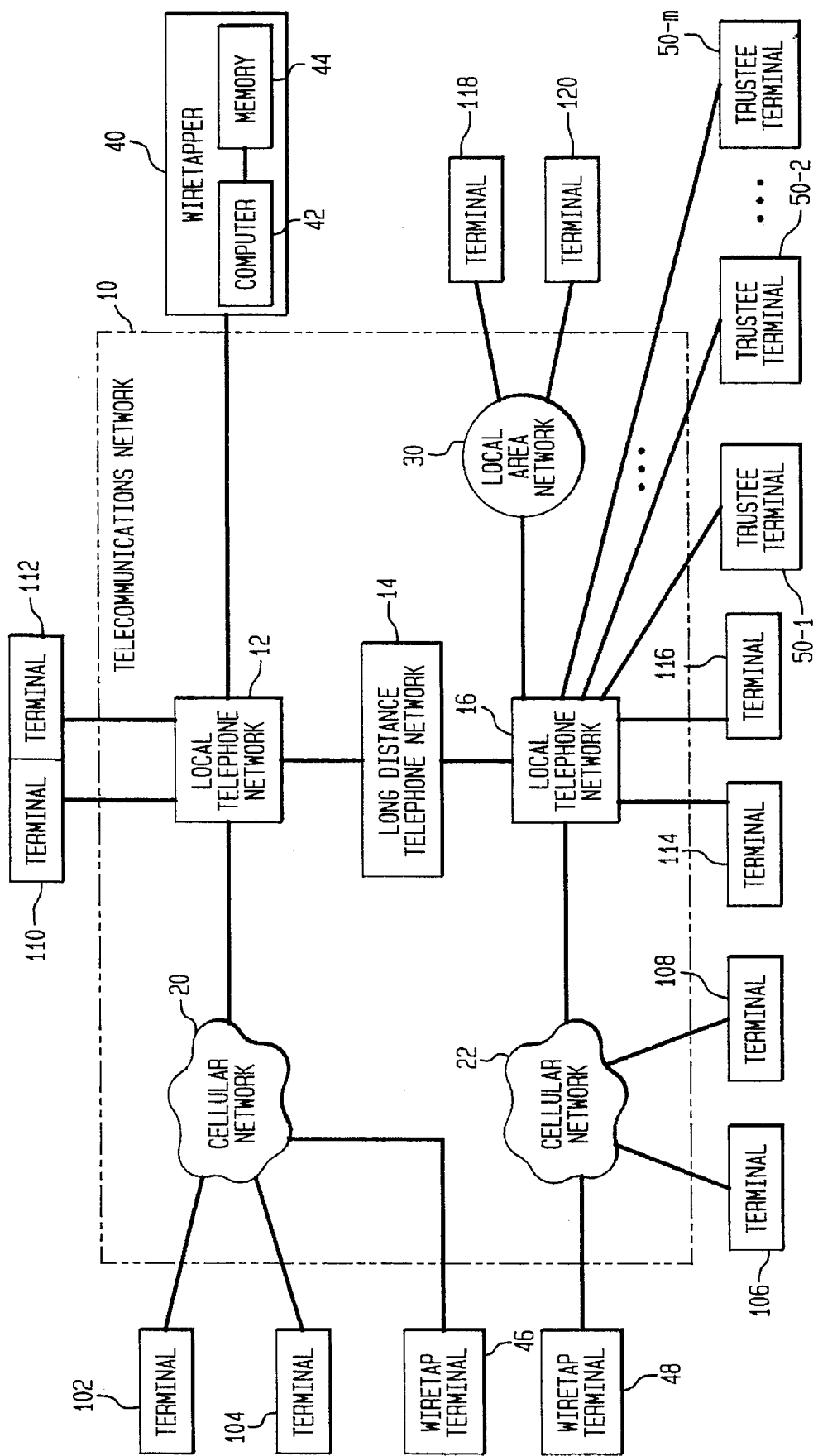
FIG. 1 schematically illustrates a telecommunications network in which a key escrow technique is used to facilitate wiretapping.

A telecommunications network which facilitates wiretapping when a warrant is issued by a lawful authority is shown in FIG. 1.

The telecommunications network 10 of FIG. 1 comprises a plurality of sub-networks. For example, the telecommunications network 10 comprises a first local telephone network 12, a long distance telephone network 14, and a second local telephone network 16.

A first cellular network 20 is connected to the first local telephone network 12 and a second cellular network 22 is connected to the second local telephone network 16.

Also connected to the second local telephone network 16 is a local area network 30.

A plurality of user terminals are connected to the various sub-networks in the telecommunications network 10. For example, the user terminals 102, 104 connected to the cellular network 20 may be portable telephones, portable fax machines, personal digital assistants, or other portable communication devices. The user terminals 106, 108 connected to the cellular network 22 are also portable communication devices.

The user terminals 110, 112 connected to the local telephone network 12 and the user terminals 114, 116 connected to the local telephone network 16 may be conventional telephones or fax machines. These user terminals may also be personal computers or work stations connected to the local telephone network via a modem.

The user terminals 118, 120 connected to the local area network 30 may also be personal computers or work stations.

The user terminals in FIG. 1 each include a small processing unit or CPU such as a microprocessor and some memory connected to the processing unit.

The telecommunications network 10 facilitates pairwise communications between any of the user terminals. Consider the case where terminal 118 is a personal computer and terminal 102 is a personal digital assistant. Terminal 118 may send an e-mail message via the second local area network 30, local telephone network 16, long distance telephone network 14, first local telephone network 12, and first cellular network 20 to the terminal 102.

Consider the case where the terminal 104 is a cellular phone and the terminal 112 is a conventional wire based telephone. In this case, voice communication is established between the terminals 104 and 112 via the cellular communication network 20 and the first local telephone network 12.

As is explained in detail below, in general, for any two users to communicate in the network 10 according to the invention, two users first determine a common session key k. Messages are then encrypted using a conventional cipher function f and the common session key k.

Also connected to the telecommunications network 10 is a wiretapper terminal 40. The wiretapper terminal comprises the computer 42 and memory 44. Additional wiretapper terminals 46 and 48 are shown as being connected to the cellular networks 20 and 22. In order for the wiretapper terminal 40 to decrypt encrypted messages exchanged between a pair of communicating user terminals, the wiretapper terminal has to acquire the common session key. In addition, if a wiretapper terminal is connected to a switched network (e.g., wiretapper terminal 40 connected to local telephone network 12) the service provider (e.g., the local telephone operating company) has to switch or route communications to be wiretapped to the wiretapper terminal for decryption. In the case of a cellular network or other network which uses a shared transmission medium, the wiretapper terminal can "hear" all communications but can only decrypt those communications for which it has the session key.

A plurality of trustee terminals 50-1, 50-2, . . . , 50-m are also connected to the communications network 10. The trustee terminals 50 store information which enables a wiretapper terminal to determine a session key. The trustee terminals provide the information for determining the session keys to a wiretapping terminal only in response to a court order.

It is a significant advantage of the present invention that the information provided by the trustees to a wiretapper only permits wiretapping for a particular bounded period of time, e.g., a set of days. In addition, the information provided by the trustees to a wiretapper permit the wiretapper to decrypt all of the communications of a user a or only the communications of user a with certain specified other parties. This information may be shared with all m trustee terminals. As described below, every subset n out of m trustees can reconstruct the total.

It is not necessary for the trustees to be connected to the network. The trustees can communicate with a wiretapper terminal via a public network 10 and secure the communications with encryption.

2. Key Escrow System

Let p and q be two large prime numbers with $q|p-1$, and let $q \in Z/pZ$ be an element of order q. For any integer m, there is an identification between Z/mZ and {0,1, . . . , m−1} and between (Z/pZ)* and {1,2, . . . , p−1}.

All of the user terminals in the telecommunications network 10 which can participate in the key escrow technique of the present invention share the same p and g. Each user terminal u has a public key P(u) ∈(Z/pZ), and a secret key S(u) ∈Z/qZ such that $g^{S(u)}$=p (u) mod p. It is assumed for all user terminals u that it is infeasible to derive S(u) from p,q, and P(u). This assumption is based on the difficulty of the discrete logarithm problem.

The keys P(u) and S(u) are referred to as the permanent keys of the user terminal u. In one embodiment of the invention, the secret key S(u) of a user terminal u is stored at a single trustee terminal 50 (See FIG.1). In an alternative embodiment of the invention, a verifiable share $S_{v,i}$(u) of secret Key S(n)is stored at each of a number of terminals $v_i$, where i=1,2. . . vn. The trustees provide wiretapper encrypted information derived from S(u) so wiretappers can decrypt messages. The information may be provided from the trustees to the wiretappers via the network 10 or via an electronic or manual channel outside of the network 10.

As indicated above, a clear text message m is encrypted according c=f(k,m) and is decrypted according to m=$f^{-1}$(k, c). The clear text message m can be derived from c if, and only if, k is known, but k cannot be efficiently derived from c and m.

Let h:Z/pZ×Z/pZ→Z/pZ be a one way hash function. Given d and $d_i$≠d, $Y_i$=h(x,$d_i$) for a polynomial number of i∈Z and some unknown x, it is infeasible to find h(x,d).

3. Protocol for User a and User b on Day d

Consider the case where a court orders the wiretap of communications involving a user terminal a (e.g., the portable telephone 104 connected to the cellular network 20) and one or more user terminals b (e.g., a telephone 110 connected to the first local telephone network 12 and a portable telephone 108 connected to the second cellular network 22). The wiretap will be performed by the wiretap terminal 46 which "eavesdrops" on the shared transmission medium of the first cellular network 20.

Let P(a), S(a) and P(b), S(b) be the permanent and secret keys of the user terminals a and b, respectively.

The protocol followed by the user terminals a and b is illustrated in FIG. 2 and described below.

1. First, user terminals a and b establish non-interactively their secret session key k(a,b,d)=k(b,a,d) which is computed by user terminal a as k(a,b,d)=h (P(b)$^{S(a)}$,d) and by user terminal b as k(b,a,d)=h (P(a)$^{S(b)}$,d). Note that d designates a predetermined bounded time period such as a particular day or a particular group of days (step 1 of FIG. 2). Recall that $g^{s(u)}$=P(u)mod p. Thus, P(a)=$g^{s(a)}$/mod p and P(b)=$g^{s(b)}$/mod p. Substituting P(a) and P(b) into the equations for k(a,b,d) and k(b,a,d), shows that h($g^{s(a)s(b)}$/mod p,d)=h($g^{s(b)s(a)}$/mod p,d).

2. The user terminal a computes S(a,d)=h(S(a),d). The user terminal b computes S(b,d)=h (S(b),d) (step 2 of FIG. 2).

3. The user terminal a computes S(a,b,d)=h(S(a,d), P(b)) The user terminal b computes S(b,a,d)=h(S(b,d), P(a)) (step 3 of FIG. 2)

4. The user terminal a sends the cipher text message c(a,b,d)=f(S(a,b,d), k(a,b,d)) via the network 10 to the user terminal b. The user terminal b sends the cipher text message c(b,a,d)=f(S(b,a,d), k(b,a,d)) via the network 10 to the user terminal a (step 4 of FIG. 2). Note that the user terminal a is using S(a,b,d) as a cipher key to encrypt k (a,b,d) using f. The user terminal b can therefore not determine the common session key k(a,b,d)=k(b,a,d) by decrypting c(a,b,d).

Similarly, the user terminal a cannot decrypt the cipher text message c(b,a,d) to obtain the common session key.

5. The user terminals a and b communicate by sending encrypted messages to one another via the telecommunications network 10. The messages are encrypted using the cipher function f and common session key k(a,b,d)=k(b,a,d) (step 5 of FIG. 2). All packages encrypted using f and k should have a certain fixed structure such as one in which they are prefixed by a system dependent header before encryption.

6. Assume that a court now issues a warrant to permit certain communications to and from the user terminal a to be wiretapped. The warrant is presented to a trustee terminal which stores S(a). (It is assumed for this embodiment of the invention that the entire secret key S(a) is stored at one particular trustee terminal 50). The trustee then provides the wiretapper terminal 46 with S(a,d) or S(a,b,d) (step 5 of FIG. 2) for edge or node surveillance, respectively.

If the quantity S(a,d) or S(a,b,d) is transmitted from a trustee terminal 50 via the network 10, the quantity should be encrypted (using public key cryptography, for example) so that no terminal other than the wiretapper 46 obtains the quantity. Otherwise, the quantity S(a,d) or S(a,b,d) is provided to the wiretapper terminal through a channel which is not part of the network 10 or provided manually to the wiretapper terminal 46.

The quantity S(a,d) is provided to the wiretapper terminal 46 if it is authorized to wiretap all communications to and from the user terminal a during the time period d. Once the wiretapper terminal has S(a,d), it can compute S(a,b,d) using its CPU for any party b because P(b) is public.

The quantity S(a,b,d) is provided to the wiretapper if it is authorized to wiretap only communications to and from user terminal a and one or more specific other terminals b. In this case, a quantity S(a,b,d) is provided for each such terminal b.

In either case, the wiretapper terminal 46 can now decrypt c(a,b,d) to obtain the common session key k(a,b,d). This permits the wiretapper terminal 46 to decrypt the appropriate communications between the terminal a and terminal b (step 7 of FIG. 2).

It should be noted that if the wiretap were directed against terminal b rather than terminal a, the wiretap terminal would be provided with S(b,d) for node surveillance at terminal b and S(b,a,d) for edge surveillance at terminal b.

It should be noted the information provided to a wiretapper (S(a,d), S(b,d), S(a,b,d), S(b,a,d)) is only valid during the time period d. The time boundedness of a warrant is easily enforced. All data obtained by the wiretapper should be time stamped by the telephone company, so that the wiretapper is not able to pass data from one day for data from a different day.

Because the protocol of FIG. 2 is mainly non-interactive, it can be used in applications such as e-mail. In other words, the protocol of FIG. 2 works if only terminal a, for example, carries out its steps and the terminal b does nothing or only carries out its steps at a different time. By providing the wiretapper with S(a,d) or S(a,b,d), the wiretapper can decrypt one way messages from a terminal a to a terminal b.

The computation $g^{S(a)\ S(b)}$ in step 1 of the protocol is the most computationally intensive part of the protocol. This value depends only on the communicating parties a and b but not on the time period d. Therefore, this value can be precomputed and stored for frequent partners. Only the relatively "cheap" computations involving f and h need to be done on a real time basis.

An issue in the protocol of FIG. 2 is what happens if the terminal a cheats in step 4 of FIG. 2 and sends a corrupted value of c(a,b,d) to terminal b. In this case, a wiretapper who has S(a,d) or S(a,b,d) will not be able to decrypt c(a,b,d) to obtain the session key k(a,b,d). A solution to this problem might be to provide S(a) to the wiretapper to permit the wiretapper to determine S(a,d) or S(a,b,d) himself.

A warrant should not enable a wiretapper to "frame" or "impersonate" another terminal which is the subject of the warrant. Therefore, terminals should preferably sign their messages using other cryptographic systems with non-escrowed keys to assure they will not be framed by a wiretapper or by one or more of the trustees. This is desirable, because in an escrow system such as the system of the present invention, once the wiretapper has the session key k(a,b,d), he may try to impersonate a or b by sending messages to the other party.

4. Threshold Secret Sharing Protocol

In an alternative embodiment of the invention, the secret key of the user terminal a is divided into n verifiable secret shares $S_i(a), 1 \leq i \leq n$. There is one such verifiable share at an n-subset of the m trustee terminals (see FIG. 1).

Consider the case of a one-way communication (e.g., e-mail) between a terminal a and a terminal b.

In this case, the terminal a performs the following steps (see FIG. 3):

1. The terminal a determines $k(a,b,d)=h(P(b)^{S(a)},d)$ (step 1 of FIG. 3)
2. The terminal a determines $S_i(a,d)=h(S_i(a),d)$ for each of the verifiable secret shares $S_i(a)$ (step 2 of FIG. 3).
3. The terminal a determines $S_i(a,b,d)=h(S_i(a,d), P(b))$ for each i (step 3 of FIG. 3).
4. The terminal a determines $S(a,b,d)=T(S_1(a,b,d), S_2(a,b,d), \ldots, S_n(a,b,d))$ (step 4 of FIG. 3), where T is a threshold function such as a function described by T. P. Pedersen in "Distributed Provers with Application To Undeniable Signatures", discussed above.
5. The terminal a computes a cipher message c(a,b,d)=f(S(a,b,d), k(a,b,d)) and transmits the message from terminal a via the network 10, to terminal b (step 5 of FIG. 3.
6. The terminal a sends an information message via the network 10 to the terminal b which is encrypted using k(a,b,d) and f (step 6 of FIG. B).
7. Upon receipt of a valid warrant, the n trustees provide the wiretapper with $S_i(a,d)$'s for node surveillance of the terminal a or $S_i(a,b,d)$'s for (edge) surveillance only of communications between terminal a and a specific one or more terminals b (step 7 of FIG. 3), where
$S_i(a,b,d)=h(S_i(a,d), P(b)_i)$
$S_i(a,d)=h(S_i(a),d);$
$S_i(a)$ is a verifiable share of a secret key S(a) of party a which is known to a particular trustee i in a plurality of n trustees;
P(b) is a public key of a party b;
d is a period of time; and
h is hash function.
8. Now the wiretapper decrypts a message sent from the terminal a to the terminal b (step 8 of FIG. 3).

Conclusion

A key escrow technique is disclosed which permits cryptographic limits on wiretapping warrants. Specifically, time limits on wiretaps may be enforced. In addition, the wiretap is targeted to a specific party or specific pairs of communicating partners.

Finally, the above described embodiments of the invention are intended to be illustrative only. Numerous alternative embodiments may be devised by those skilled in the art without departing from the scope of the following claims.

We claim:

1. A method for assuring limited privacy in a communications network, comprising the steps of:

(a) sending a cipher text message of a form c(a,b,d)=f(S(a,b,d), k(a,b,d)) from a terminal of a party a via said network to a terminal of one or more parties b where:
P(a) is a public key of the party a;
S(a) is a secret key of the party a, such that $g^{S(a)}=P(a)$ mod p, p and g being integers;
P(b) is a public key of a party b;
h is a one way hash function;
f(k,m) is a cipher function;
d is a period of time;
S(a,d)=h(S(a),d);
S(a,b,d)=h(S(a,d), P(b)); and
$k(a,b,d)=h(P(b)^{S(a)},d)$ is a session key valid for the period of time d;

(b) transmitting one or more encrypted information messages through the network between said party a and said one or more parties b using f as a cipher function and k(a,b,d) as a session key; and (c) providing from a trustee to a wiretapper terminal connected to said network S(a,b,d) for each specific party b whose communications to and from party a the wiretapper terminal is authorized to decrypt or S(a,d) if the wiretapper terminal is authorized to decrypt communications to or from the party a from or to any other party b.

2. The method of claim 1, further comprising the steps of:

(a) at said wiretapper terminal, using S(a,b,d) to decrypt c(a,b,d) to obtain k(a,b,d); and (b) said wiretapper terminal using k(a,b,d) to decrypt encrypted information messages transmitted through said network between said party a and one or more parties b.

3. A method for assuring limited privacy in a communications network, comprising the steps of:

(a) sending a cipher message c=f(k,m) generated from a clear text message m via said network from a party a to a party b, said cipher message c including a common session key k of the parties a and b which is encrypted using a cipher function f and a cipher key which is derived from a secret key of the party a by the party a using a one way hash function;

(b) at least one trustee providing to a wiretapper terminal connected to said network sufficient information to permit said wiretapper terminal to decrypt said cipher message using said cipher key and obtain said session key without said wiretapper terminal obtaining said secret key of the party a;

(c) transmitting an information message via said network between said parties a and b, the message being encrypted using said cipher function f and said session key; and (d) decrypting said information message transmitted between said parties a and b at said wiretapper terminal.

4. The method of claim 3, further comprising the step of: determining said session key by using a processing unit located at said terminal of said party a according to $k(a,b,d)=h(P(b)^{S(a)},d)$, where:

P(b) is a public key of the party b;

S(a) is a secret key of the party a;

d designates a period of time; and h is a one way hash function.

5. The method of claim 3, further comprising the step of selecting said cipher key derived from the secret key of the party a to be of a form:

$S(a,b,d)=h(S(a,d), P(b))$, where:
$S(a,d)=h(S(a),d)$;
$S(a)$ is a secret key of party a;
$P(b)$ is a public key of a party b;
d is a period of time; and
h is a one way hash function.

6. The method of claim 5, wherein a session key k is used to create the cipher message and further comprising the step of selecting said cipher message to be of a form:

$c(a,b,d)=f(S(a,b,d), k(a,b,d))$.

7. The method of claim 3, further comprising the step of the wiretapper terminal decrypting said information message transmitted between said party a and one or more specific parties b.

8. The method of claim 7, further comprising the step of one or more trustees providing said wiretapper terminal with sufficient information to decrypt said cipher message only for said one or more specific parties b.

9. The method of claim 8, further comprising the step of a single trustee providing said wiretapper terminal with information of a form:

$S(a,b,d)=h(S(a,d), P(b))$, where:
$S(a,d)=h(S(a),d)$;
$S(a)$ is a secret key of the party a;
$P(b)$ is a public key of the party b;
d is a period of time; and
h is a one way hash function,
for each of said one or more specific parties b.

10. The method of claim 7, further comprising the step of one or more trustees providing said wiretapper terminal with sufficient information to decrypt said cipher message for any party b.

11. The method of claim 10, further comprising the step of a single trustee providing said wiretapper terminal with information of a form:

$S(a,d)=h(S(a),d)$; and
said wiretapper terminal deriving said cipher key using said information $S(a,d)$, where:
$S(a)$ is a secret key of a party a;
$P(b)$ is a public key of the party b;
d is a period of time; and
h is a one way hash function.

12. The method of claim 3, further comprising the stop of selecting said cipher key derived from said secret key to be of a form:

$S(a,b,d)=T(S_1(a,b,d), S_2(a,b,d, \ldots, S_n(a,b,d))$
where:
T is a threshold function;
$S_i(a,b,d)=h(S_i(a,d),P(b))$;
$S_i(a,d)=h(S_i(a),d)$;
$S_i(a)$ is a verifiable share of a secret key $S(a)$ of the party a which is
known to a particular trustee i in a plurality of n trustees;
$P(b)$ is a public key of a party b;
d is a period of time; and
h is a hash function.

13. The method of claim 3, further comprising the step of determining said cipher key using a terminal of said party a according to a method comprising the steps of:

(a) using a processing unit in said terminal of said party a, determining $S_i(a,d)=h(S_i(a),d)$ for $1 \leq i \leq n$ where $S_i(a)$ is a verifiable share of a secret key $S(a)$ of the party a known to a particular trustee i out of a plurality of n trustees, d is a period of time, and h is a hash function;

(b) using said processing unit in said terminal of said party a, determining $S_i(a,b,d)=h(S_i(a,d), P(b))$ for $1 \leq i \leq n$; and (c) using said processing unit in said terminal a, combining said quantities $S_i(a,b,d)$ to obtain said cipher key $S(a,b,d)$.

14. The method of claim 13, further comprising the step of the wiretapper terminal decrypting said information message transmitted between said party a and any party b.

15. The method of claim 13, further comprising the step of the wiretapper terminal decrypting said information message transmitted between said party a and one or more specific parties b.

16. The method of claim 15, further comprising the step of each trustee i out of said plurality of trustees providing $S_i(a,b,d)$ to said wiretapper terminal for each specific party b.

17. The method of claim 3, further comprising the step of deriving said cipher key from the secret key of the party a and a period of time using a hash function so that the cipher key is valid only for said period of time.

18. The method of claim 3, further comprising the step of deriving said session key from secret key information of said party a, public key information of said party b, and time period information so that said session key is valid only for said period of time.

19. A method for performing a wiretapping in a communications network, comprising the steps of:

(1) using a terminal a connected to said network, deriving a common session key which is valid for a particular period of time from (i) a secret key of said terminal a, (ii) a public key of a terminal b also connected to said network, and (iii) information indicating said period of time;

(2) using said terminal a, deriving a cipher key which is valid for said particular period of time from said secret key of said terminal a and said public key of said terminal b;

(3) transmitting via said network from said terminal a to said terminal b a cipher message in which said common session key is encrypted by said cipher key using a cipher function;

(4) transmitting via said network from said terminal a to said terminal b an information message encrypted using said common session key and said cipher function; and (5) in response to a warrant, providing to a wiretapper terminal connected to said network information which permits said wiretap terminal to decrypt the cipher message and obtain the common session key without the wiretapper terminal obtaining knowledge of the secret key of the terminal a.

20. A method for assuring limited privacy in a communications network, comprising the steps of:

(a) sending a cipher message $c=f(k,m)$ generated from a clear text message m via said network from a party a to a party b, said cipher message c including a common session key k of the parties a and b which is encrypted using a cipher function f and a cipher key which is derived from a secret key of the party a by the party a using a one way hash function and selecting the cipher key derived from the secret key of part a to be of a form:

$S(a,b,d)=h(S(a,d), P(b))$, where:
$S(a,d)=h(S(a),d)$;
$S(a)$ is a secret key of party a;
$P(b)$ is a public key of a party b;

d is a period of time; and h is a one way hash function;

(b) at least one trustee providing to a wiretapper terminal connected to said network sufficient information to permit said wiretapper terminal to decrypt said cipher message using said cipher key and obtain said session key without said wiretapper terminal obtaining said secret key of the party a;

(c) transmitting an information message via said network between said parties a and b, the message being encrypted using said cipher function f and said session key; and (d) decrypting said information message transmitted between said parties a and b at said wiretapper terminal.

21. A method for assuring limited privacy in a communications network, comprising the steps of:

(a) a first party a sending a cipher message c=f(k,m) generated from a clear text message m via said network to a party b, said cipher message c including a common session key k of the parties a and b which is encrypted using a cipher function f(k,m) and a cipher key which is derived from a secret key of the party a by the party a using a one way hash function;

(b) at least one trustee providing to a wiretapper terminal connected to said network sufficient information to permit said wiretapper terminal to decrypt said cipher message using said cipher key and obtain said session key without said wiretapper terminal obtaining said secret key of the party a;

(c) parties a and b transmitting an information message via said network between said parties a and b, the message being encrypted using said cipher function f(k,m) and said session key;

(d) the wiretapper terminal decrypting said information message transmitted between said parties a and one or more specific parties b; and (e) the at least one trustee providing said wiretapper terminal with sufficient information to decrypt said cipher message only for said one or more specific parties b in a form:

$S(a,b,d)=h(S(a,d), P(b))$, where:

$S(a,d)=h(S(a),d)$;

S(a) is a secret key of the party a;

P(b) is a public key of the party b;

d is a period of time; and h is a one way hash function;

for each of said one or more specific parties b.

22. A method for assuring limited privacy in a communications network, comprising the steps of:

(a) a first party a sending a cipher message c=f(k,m) generated from a clear text message m via said network to a party b, said cipher message c including a common session key k of the parties a and b which is encrypted using a cipher function f(k,m) and a cipher key which is derived from a secret key of the party a by the party a using a one way hash function;

(b) a trustee providing to a wiretapper terminal connected to said network sufficient information to permit said wiretapper terminal to decrypt said cipher message using said cipher key and obtain said session key without said wiretapper terminal obtaining said secret key of the party a, said information of a form;

$S(a,d)=h(S(a),d)$; and said wiretapper terminal deriving said cipher key using said information S(a,d), where:

S(a) is a secret key of a party a;

P(b) is a public key of the party b;

d is a period of time; and h is a one way hash function;

(c) parties a and b transmitting an information message via said network between themselves, the message being encrypted using said cipher function f(k,m) and said session key; and (d) the wiretapper terminal decrypting said information message between said party a and one or more specific parties b.

23. A method for assuring limited privacy in a communications network, comprising the steps of:

(a) a first party a sending a cipher message c=f(k,m) generated from a clear text message m via said network to a party b, said cipher message c including a common session key k of the parties a and b which is encrypted using a cipher function f(k,m) and a cipher key which is derived from a secret key of the party a by the party a using a one way hash function and selecting said cipher key derived from said secret key to be of a form:

$S(a,b,d)=T(S_1(a,b,d),S_2(a,b,d), \ldots, S_n(a,b,d))$ where:

T is a threshold function;

$S_i(a,b,d)=h(S_i(a,d),P(b))$;

$S_i(a,d)=h(S_i(a),d)$;

$S_i(a)$ is a verifiable share of a secret key S(a) of the party a which is known to a particular trustee i in a plurality of n trustees;

P(b) is a public key of a party b;

d is a period of time; and h is a hash function;

(b) at least one trustee providing to a wiretapper terminal connected to said network sufficient information to permit said wiretapper terminal to decrypt said cipher message using said cipher key and obtain said session key without said wiretapper terminal obtaining said secret key of the party a;

(c) parties a and b transmitting an information message via said network between themselves, the message being encrypted using said cipher function f(k,m) and said session key; and (d) the wiretapper terminal decrypting said information message transmitted between said parties a and b.

24. A method for assuring limited privacy in a communications network, comprising the steps of:

(a) a first party a sending a cipher message c=f(k,m) generated from a clear text message m via said network to a party b, said cipher message c including a common session key k of the parties a and b which is encrypted using a cipher function f(k,m) and a cipher key which is derived from a secret key of the party a by the party a using a one way hash function;

(b) at least one trustee providing to a wiretapper terminal connected to said network sufficient information to permit said wiretapper terminal to decrypt said cipher message using said cipher key and obtain said session key without said wiretapper terminal obtaining said secret key of the party a;

(c) parties a and b transmitting an information message via said network between themselves, the message being encrypted using said cipher function f(k,m) and said session key; and (d) the wiretapper terminal decrypting said information message transmitted between said parties a and b; and (e) determining said cipher key using a terminal of said party a according to a method comprising the steps of:
   (i) using a processing unit in said terminal of said party a, determining $S_i(a,d)=h(S_i(a),d)$ for $1 \leq i \leq n$ where $S_i(a)$ is a verifiable share of a secret key $S(a)$ of the party a known to a particular trustee i out of a plurality of n trustees, d is a period of time, and h is a hash function;
   (ii) using said processing unit in said terminal of said party a, determining $S_i(a,b,d)=h(S_i(a,d), P(b))$ for $1 \leq i \leq n$; and
   (iii) using said processing unit in said terminal a, combining said quantities $S_i(a,b,d)$ to obtain said cipher key $S(a,b,d)$.

* * * * *